US012616100B2

(12) United States Patent
Weller

(10) Patent No.: US 12,616,100 B2
(45) Date of Patent: May 5, 2026

(54) EJECTION CHUTE FOR AN AGRICULTURAL BALER

(71) Applicant: AGCO Corporation, Duluth, GA (US)

(72) Inventor: Lucas Andrew Weller, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 596 days.

(21) Appl. No.: 18/158,590

(22) Filed: Jan. 24, 2023

(65) Prior Publication Data

US 2023/0255146 A1 Aug. 17, 2023

Related U.S. Application Data

(60) Provisional application No. 63/267,967, filed on Feb. 14, 2022.

(51) Int. Cl.
*A01F 15/08* (2006.01)
*A01F 15/04* (2006.01)

(52) U.S. Cl.
CPC ........ *A01F 15/0875* (2013.01); *A01F 15/046* (2013.01)

(58) Field of Classification Search
CPC ........................... A01F 15/0875; A01F 15/046
See application file for complete search history.

(56) References Cited

U.S. PATENT DOCUMENTS

| | | | |
|---|---|---|---|
| 3,243,028 A | | 3/1966 | Tufts |
| 3,589,533 A | * | 6/1971 | Miller .................... B65G 57/03 |
| | | | 414/794 |
| 3,889,823 A | * | 6/1975 | Williamson ......... A01D 85/005 |
| | | | 414/789.7 |
| 4,187,941 A | | 2/1980 | Martin |
| 4,788,901 A | | 12/1988 | Klinner et al. |
| 6,232,565 B1 | * | 5/2001 | Gottlober ............ A01F 15/0875 |
| | | | 177/136 |
| 11,140,830 B2 | | 10/2021 | Olander et al. |
| 2022/0210979 A1 | | 7/2022 | Alley et al. |
| 2022/0248608 A1 | | 8/2022 | Grady |

FOREIGN PATENT DOCUMENTS

EP 3903561 A1 11/2021

OTHER PUBLICATIONS

European Patent Office, International Search Report related to EP Patent Application No. 23152648.4 , mail date Jul. 6, 2023, 10 pages.
UK Intellectual Property Office, Search report for related UK Application No. GB2215916.4, dated Mar. 28, 2023, 3 pages.

* cited by examiner

*Primary Examiner* — Claude J Brown

(57) ABSTRACT
An ejection chute for an agricultural baler has an ejection chute that includes a channel having a base wall and first and second side walls extending upwards from either side of the base wall, and in which a region of the base wall is provided with a first window. Various deposit mechanisms are provided for controlling movement of a formed bale through the first window.

18 Claims, 10 Drawing Sheets

EJECTION CHUTE FOR AN AGRICULTURAL BALER

CROSS REFERENCE TO RELATED APPLICATION

This application claims the benefit of U.S. Provisional Application No. 63/267,967, filed Feb. 14, 2022, which is hereby incorporated by reference in its entirety.

BACKGROUND OF THE INVENTION

Field of Invention

The present invention relates to an agricultural baler and in particular to a baler of the square bale type. The invention has particular relevance to an arrangement for discharge of such bales from the baler.

Description of Related Art

It is known to provide balers of the kind that gather harvested crop from a windrow formed on the ground and then compact the harvested crop into bales. In a known kind of apparatus, the harvested crop is lifted from a formed windrow by a pick up mechanism and transferred to a stuffer chute before being introduced into a first end of a baling chamber. A reciprocating plunger is provided to compress the crop material into a flake and by advancing consecutive flakes within the baling chamber under the action of the plunger to form a bale. Such parallelepiped bales are generally elongate and known as square bales. Once a bale of a certain size has been formed a knotter mechanism is actuated to tie the formed bale. The formed bale will then be driven from a second end of the baling chamber to an ejection chute or platform from where the formed bale will be deposited to the ground. Collection of the deposited formed bales then follows as a separate operation.

Nevertheless, it is not ideal that formed bales are dropped from the end of an ejection platform. In particular there can be a lack of control as to how the bales are ejected and their subsequent orientation on the ground, the orientation of the bales affecting the ease of collection of such bales. Accordingly, there is a desire to more closely control the depositing of formed bales from such a baler.

It is an advantage of the present invention that this problem is addressed.

SUMMARY OF THE INVENTION

According to a first aspect of the present invention an ejection chute for an agricultural baler comprises a channel having a base wall and first and second side walls extending upwards from either side of the base wall, in which a region of the base wall is provided with a first window, and a deposit mechanism for controlling movement of a formed bale through the first window.

Preferably, the deposit mechanism comprises at least a first selectively displaceable panel at a first side of the first window, the first panel being selectively displaceable between a first position in which travel of a formed bale through the first window is prevented and a second position in which deposit of the formed bale through the first window is permitted.

Preferably, the first side wall of the ejection chute is provided with a laterally extending support for the first selectively displaceable panel.

Preferably, the first side wall of the ejection chute is provided with a second window extending alongside the first window in the base panel.

Preferably, the deposit mechanism further comprises a second selectively displaceable panel located along a second side of the first window, the second selectively displaceable panel being selectively displaceable between a first position in which travel of a formed bale through the first window is prevented and a second position in which deposit of the formed bale through the first window is permitted.

Preferably, the second selectively displaceable panel includes a second portion formed at an angle to a first portion.

Preferably, the ejection chute further comprises a deflector suspended from the first selectively displaceable panel.

Preferably the ejection chute further comprises a first actuator associated with the first selectively displaceable panel, whereby the first actuator controls the displacement of the first selectively displaceable panel. More preferably, the first actuator is in communication with a controller configured to control actuation of the first actuator.

Preferably, the ejection chute also comprises a second actuator associated with the second selectively displaceable panel, whereby the second actuator controls the displacement of the second selectively displaceable panel. More preferably, the second actuator is in communication with a controller configured also to control actuation of the first actuator.

Alternatively, a mechanical apparatus is provided to control displacement of the first selectively displaceable panel.

Preferably, a first mechanical apparatus controls operation of the first and second selectively displaceable panels.

Alternatively, a first mechanical apparatus controls operation of the first selectively displaceable panel and a second mechanical apparatus controls operation of the second selectively displaceable panel.

According to a second aspect, an agricultural baler comprises a baling mechanism including a baling chamber for the sequential production of square bales, and an ejection chute in accordance with the first aspect.

Preferably the baler further comprises the controller configured to control actuation of the first and second actuators.

According to a third aspect, a method of operation of an ejection chute in accordance with certain embodiments of the first aspect of the invention comprises the step of causing operation of at least the first actuator.

Preferably, the method comprises the step of operating only the first actuator. Alternatively, the method comprises the step of concurrently operating the first and second actuators.

Preferably, the method comprises the step of selecting via a Human Machine Interface whether only the first actuator is to be operated or whether the first and second actuators are to be operated concurrently.

Preferably, the method further comprises the step of the step of detecting the presence of a formed bale above the first window.

According to a fourth aspect, a method of operation of an ejection chute in accordance with certain embodiments of the first aspect of the invention comprises the step of operating only the first mechanical apparatus.

Alternatively, the method comprises the step of concurrently operating the first and second mechanical apparatus.

Preferably the method comprises the step of selecting via a mechanical interlock whether only the first selectively displaceable panel or both the first and second selectively displaceable panels are to be operated by the mechanical apparatus.

Preferably, the method further comprises the step of the step of detecting the presence of a formed bale above the first window.

According to a fifth aspect, a baler further comprises a second baling chamber for the sequential production of square bales, the second baling chamber producing square bales concurrently with the first baling chamber, and a second ejection chute according to the first aspect.

According to a sixth aspect, a baler further comprises a second baling chamber for the sequential production of square bales, the second baling chamber producing square bales concurrently with the first baling chamber, and a second ejection chute according to certain embodiments of the first aspect in which the actuator(s) of the second ejection chute is in communication with the controller configured also to control actuation of the actuator(s) of the first ejection chute.

Preferably, the first selectively displaceable panel of the first ejection chute is located adjacent to the first selectively displaceable panel of the second ejection chute.

Preferably, the first and second ejection chutes are arranged adjacent to one another.

Preferably, the first and second ejection chutes are arranged parallel to one another.

BRIEF DESCRIPTION OF THE DRAWINGS

The invention will now be described, by way of example only, with reference to the accompanying drawings, in which.

Figures 12, 13:
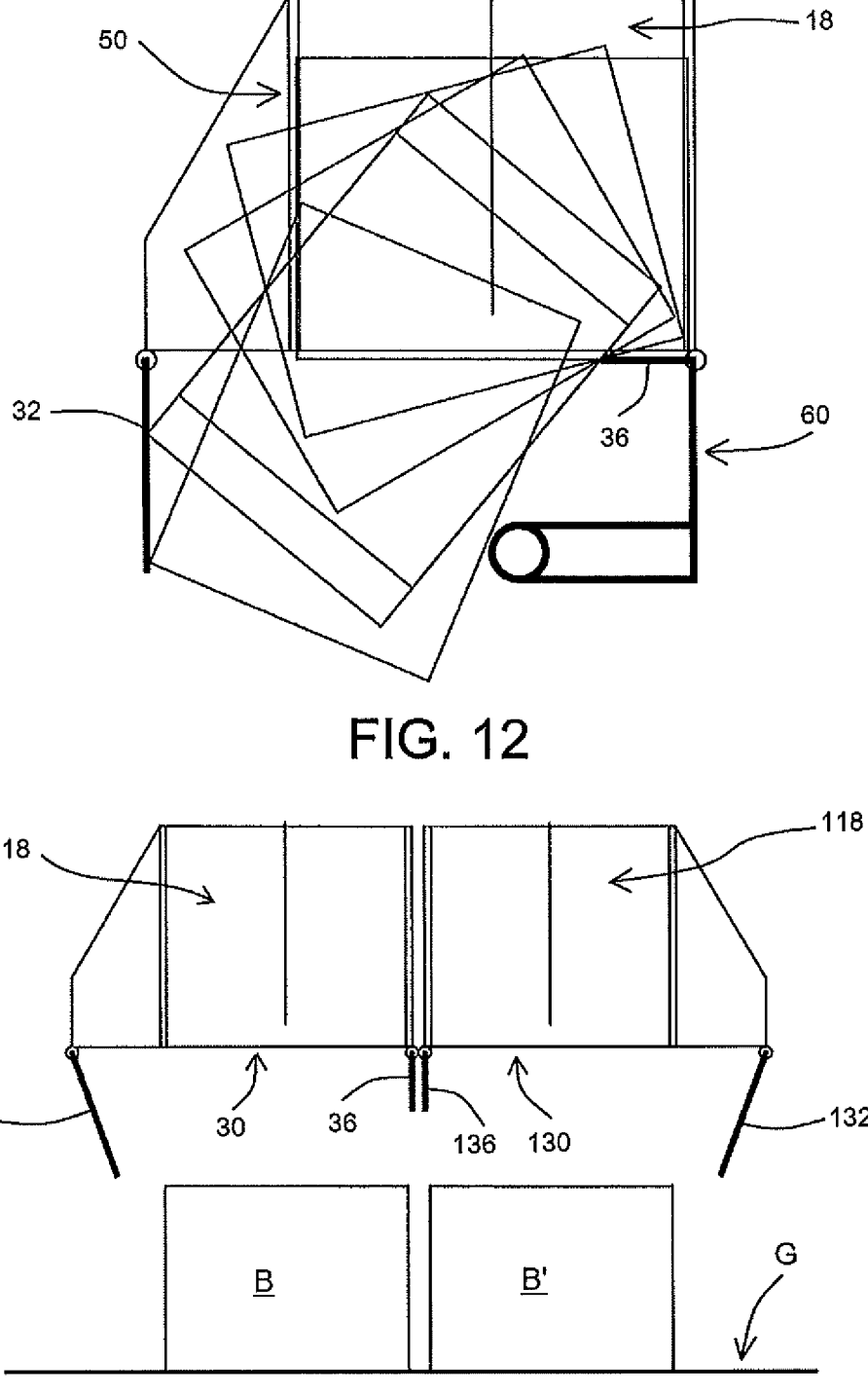
Figure 14:
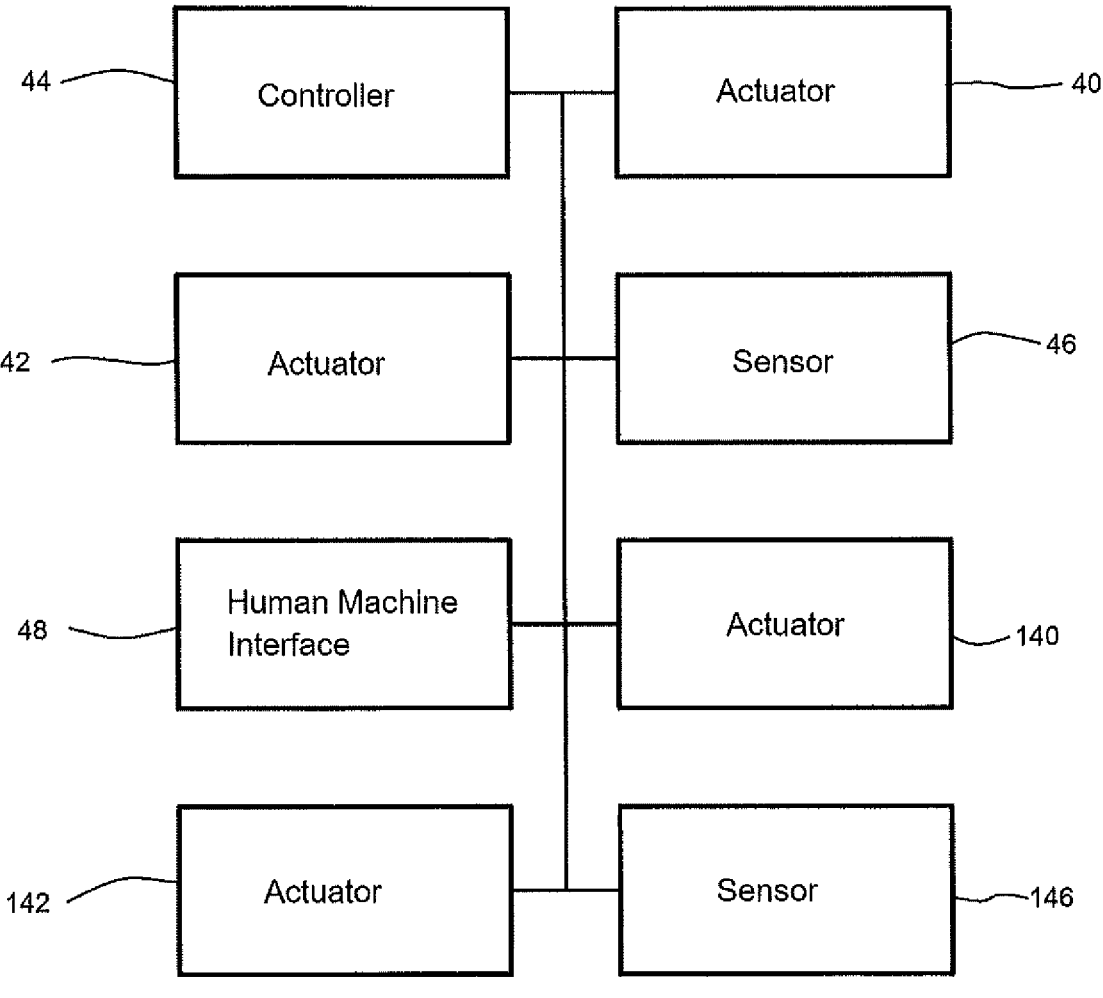
Figure 15:
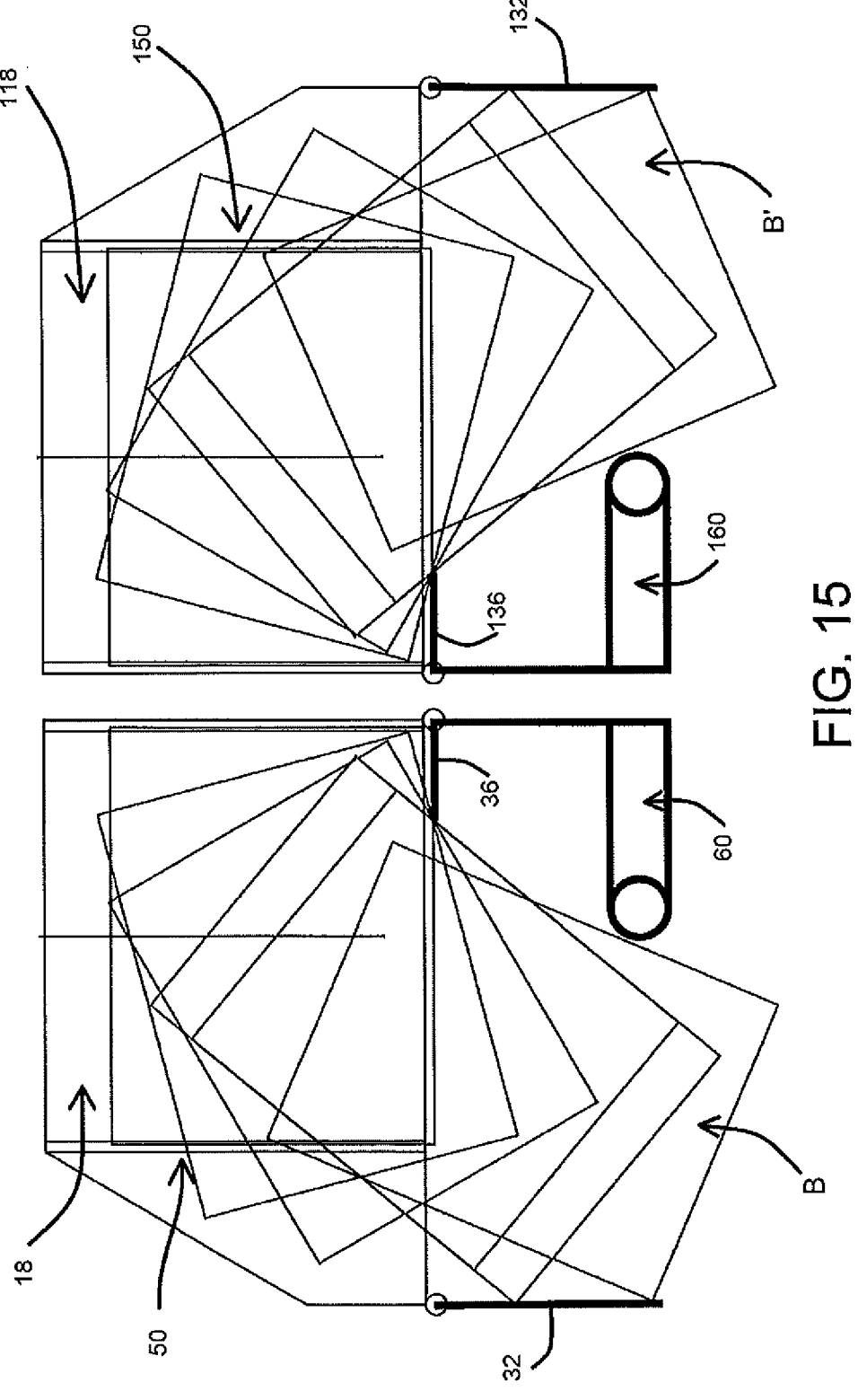

4 and a bale further exiting the ejection chute and showing the travel of the bale as it exits the ejection chute;

FIG. 12 shows a section thorough a fourth embodiment of an ejection chute in accordance with the present invention with the selectively displaceable panels in a final position and a bale further exiting the ejection chute and showing the travel of the bale as it exits the ejection chute;

FIG. 13 shows a section thorough a fifth embodiment of an ejection chute arrangement in accordance with an aspect of the present invention with the selectively displaceable panels in a final position and first and second bales deposited on the ground;

FIG. 14 shows a schematic view of elements of an aspect of the present invention; and FIG. 15 shows a section thorough a sixth embodiment of an ejection chute arrangement in accordance with an aspect of the present invention with the selectively displaceable panels in a final position and showing the travel of the first and second bales as they exit the ejection chute.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
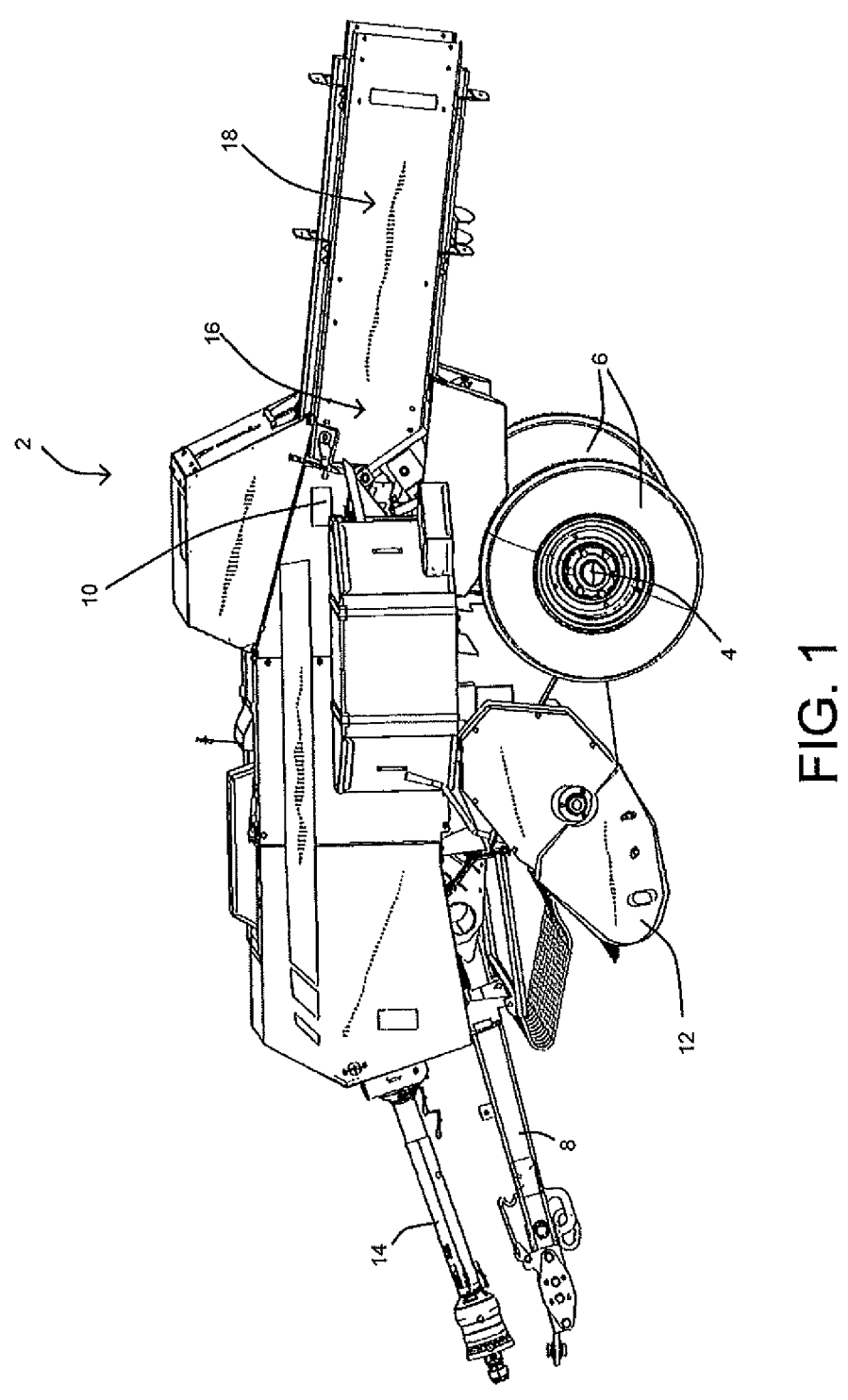
FIG. 1 shows a view of an agricultural baler including an ejection chute in accordance with the present invention.

With reference to FIG. 1, an agricultural baler 2 is shown. The baler 2 has a wheeled chassis or frame including an axle 4 and a pair of laterally spaced wheels 6 that support the chassis above the ground. The baler 2 is provided with a forwardly extending tongue 8 for connecting the baler 2 to a towing vehicle, such as a tractor.

The baler 2 additionally comprises a baling chamber 10, extending generally in a fore-and-aft direction and which are supported on the chassis. The baler 2 is provided with a pick up apparatus 12 by which harvested crop material arranged in a windrow on a ground surface may be lifted and directed towards the baling chamber 10. The harvested crop material is directed to a stuffer chute at a forward end of the baling chamber 10. The harvested crop material there forms a flake of harvested crop material. The baler 2 is further provided with a reciprocating plunger that compresses the flake of harvested crop and pushes it rearwards into the baling chamber 10 to generate a forming bale within the baling chamber. Movement of the plunger is enabled by a drive connection 14 adapted to be connected to a Power Take Off (PTO) of the towing vehicle.

The baler 2 additionally comprises a plurality of knotter units 16 immediately downstream of the baling chamber 10 for tying one or more strands of binding material (such as twine, wire, cord or the like) around the bales of crop material being formed in the baling chambers.

Once the forming bale has been formed, the formed bale is directed to a discharge or ejection chute 18. In practice the baling chamber 10 and the discharge chute 18 may be formed as a single channel. Alternatively, the discharge chute 18 may be coupled to the baling chamber 10 in any suitable manner. The preference is to form the ejection chute of the present invention as part of the channel forming the baling chamber to avoid lengthening this channel. However, certain advantages may still be obtained by forming the ejection chute of the present invention as a "bolt-on" component to existing ejection chutes.

Figures 2, 3:
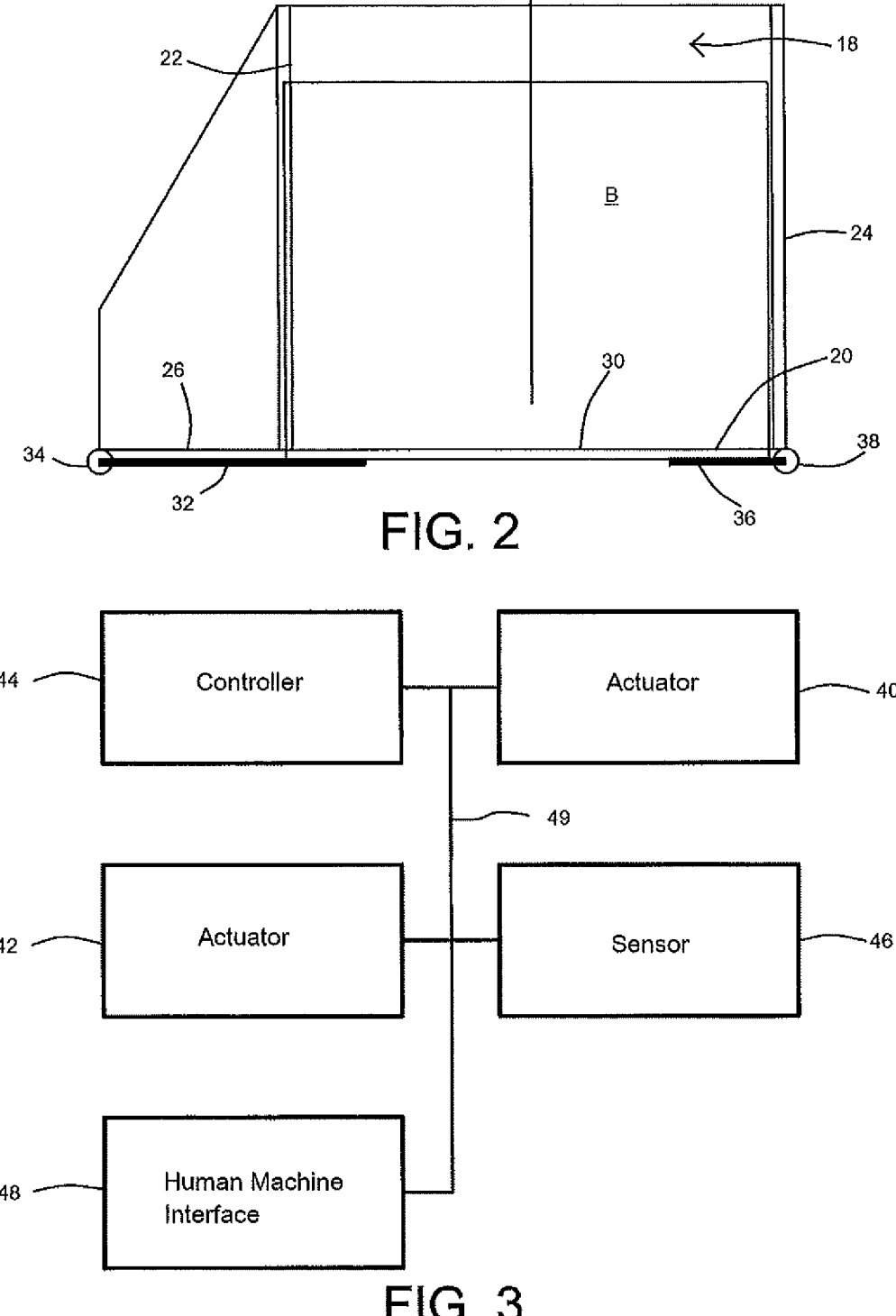
FIG. 2 shows a section thorough a first embodiment of an ejection chute in accordance with the present invention with the selectively displaceable panels in a first position and a bale within the ejection chute.
FIG. 3 shows a schematic view of elements of the invention.

Turning to FIG. 2, a section of an ejection chute 18 according to a first embodiment of the invention is shown. The ejection chute 18 comprises a channel having a base wall 20 and first and second side walls 22,24 extending upwards from either side of the base wall 20. The base wall 20 conveniently includes an outwardly extending flange 26 extending to one side of the ejection chute 18. The ejection chute 18 may optionally include an upper wall extending between the first and second side walls 22,24.

A region of the base wall is provided with an opening or window 30. The window 30 is suitable shaped and sized to allow a formed bale B to pass though the window 30. A first selectively displaceable panel 32 is adapted to pivot about a longitudinal axis 34 located to a first side of the window 30. In the illustrated embodiment the longitudinal axis 34 of the first selectively displaceable panel 32 extends along a distal end of the flange 26. A second selectively displaceable panel 36 is adapted to pivot about a longitudinal axis 38 located at a second side of the window. In the illustrated embodiment the longitudinal axis 38 of the second selectively displaceable panel 36 extends along a base of the second wall 24.

The first and second selectively displaceable panels 32,36 are operable between a first position in which travel of a formed bale through the window 30 is prevented by the first and second selectively displaceable panels 32,36 and a second position in which controlled egress of the formed bale through the window is permitted (as described below). As such, operation of the first and second selectively displaceable panels 32,36 provides a deposit mechanism for controlled deposit of the formed bales through the window 30.

It is not necessary for the first and second selectively displaceable panels 32,36 to extend across the window 30. In the illustrated embodiment, the first and second selectively displaceable panels 32,36 only extend part way across the window 30 and are sufficient to retain the formed bale B within the ejection chute 18.

The first and second selectively displaceable panels 32,36 are each provided with suitable actuators 40,42, for example hydraulic actuators. A controller 44 is provided to control movement of the actuators 40,42 and so movement of the first and second selectively displaceable panels 32,36. A sensor 46 in communication with the controller 44 may optionally be provided to determine when the formed bale B is in position above the window 30.

In a first embodiment, the first and second selectively displaceable panels 32,36 are actuated together.

Figures 4, 5:
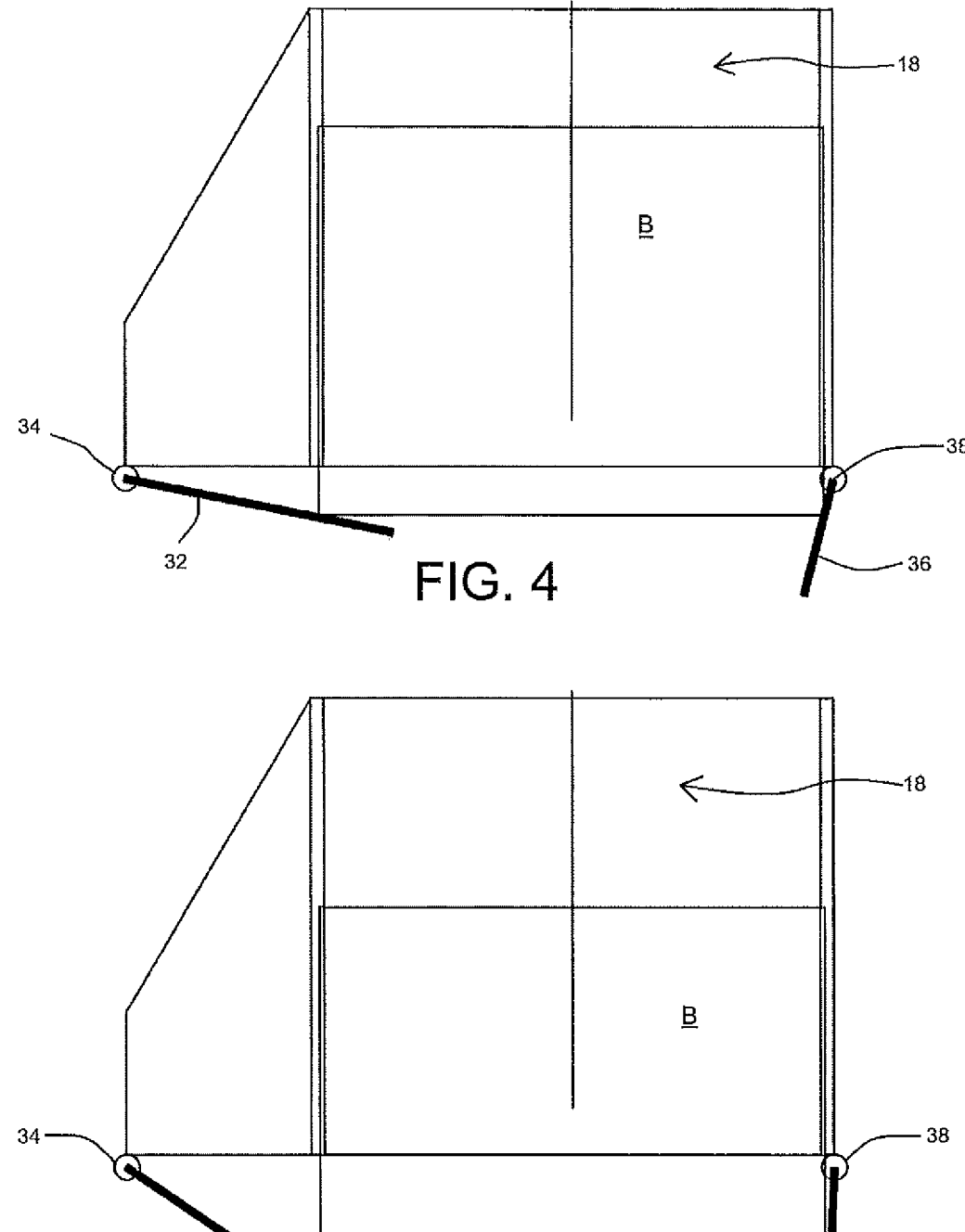
FIG. 4 shows a section thorough the ejection of chute FIG. 2 with the selectively displaceable panels in a second position and a bale beginning to exit the ejection chute.
FIG. 5 shows a section thorough the ejection chute of FIG. 2 with the selectively displaceable panels in a third position and a bale further exiting the ejection chute.

As seen in FIG. 4, the actuator 40 allows a relatively small angular movement of the first selectively displaceable panel 32 and the actuator 42 allows a relatively large angular movement of the second selectively displaceable panel 36. The formed bale B is allowed to descend a short distance though the window 30.

Once the second selectively displaceable panel 36 is arranged to depend substantially vertically the actuator 40 ceases to move the second selectively displaceable panel 36. The actuator 42 continues to control movement of the first selectively displaceable panel 32 about the longitudinal axis 38 so as allow the formed bale B to descend from the ejection chute 18 in a controlled manner (FIG. 5).

Figure 6:
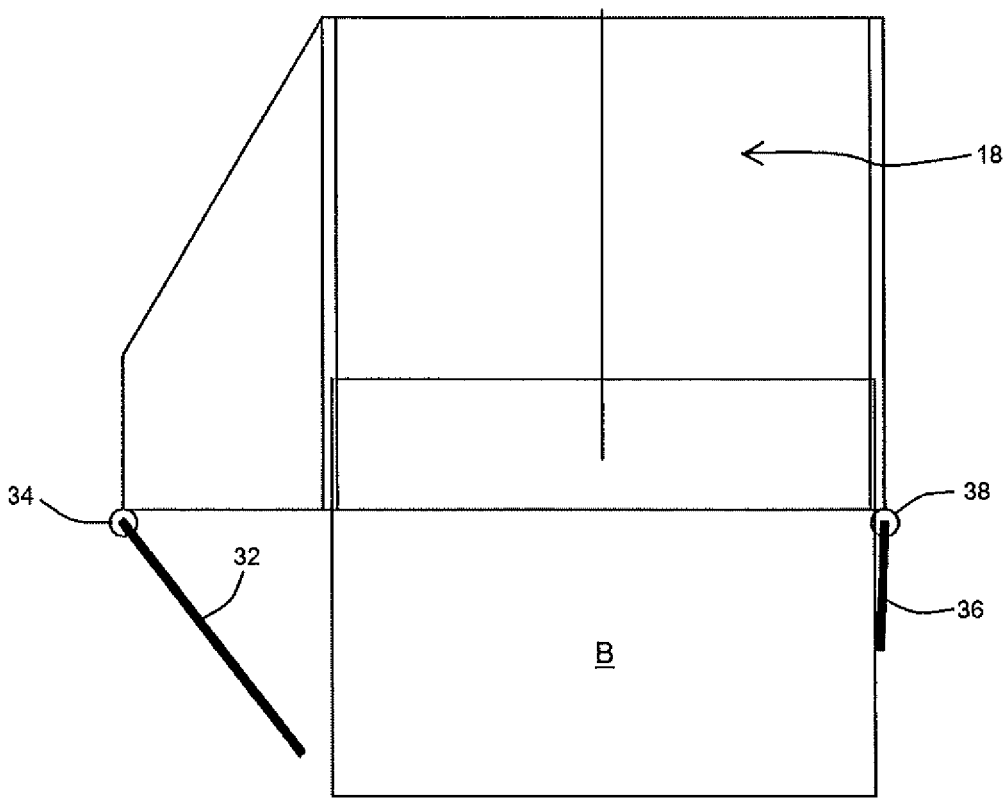
FIG. 6 shows a section thorough the ejection chute of FIG. 2 with the selectively displaceable panels in a fourth position and a bale further exiting the ejection chute.
Figures 7, 8:
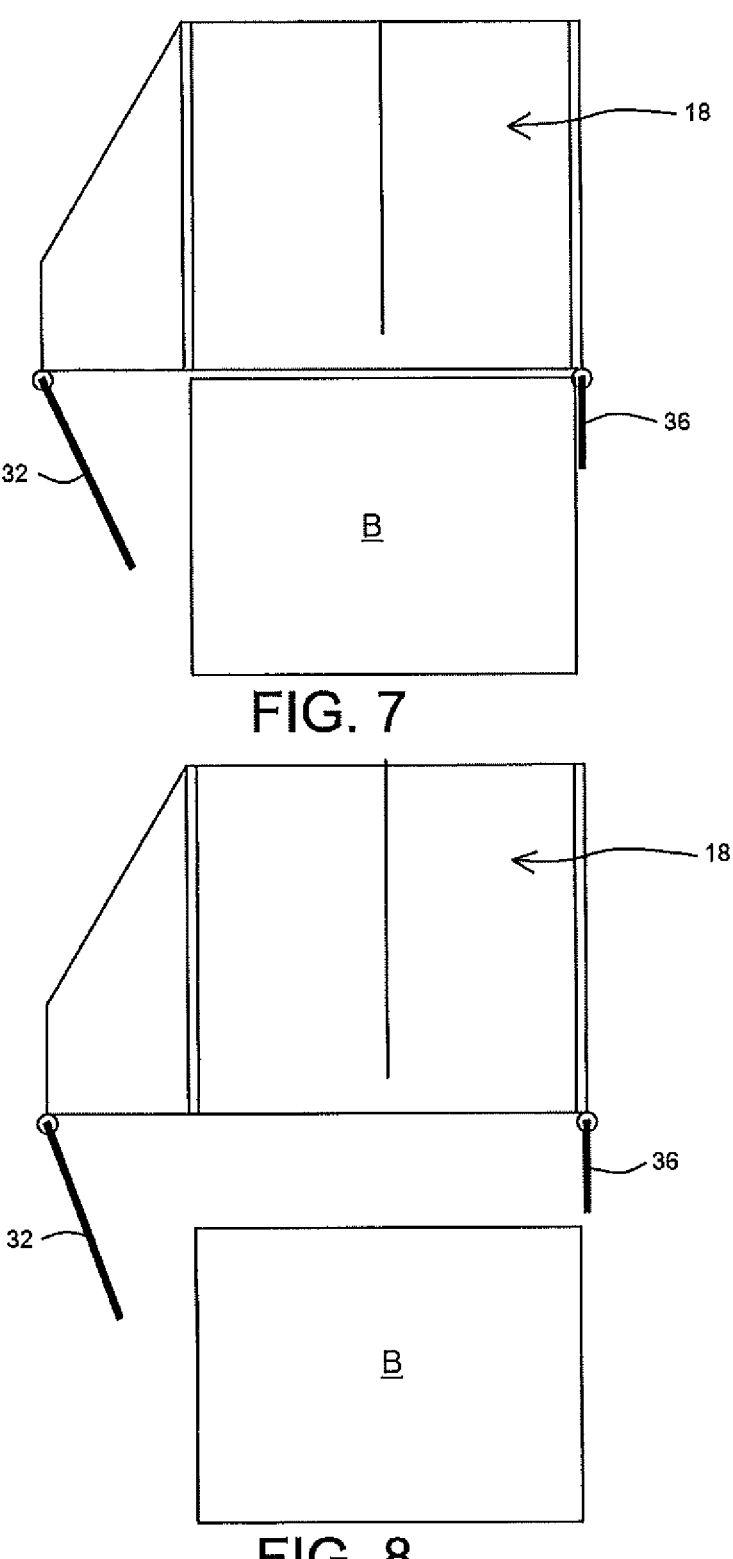
FIG. 7 shows a section thorough the ejection chute of FIG. 2 with the selectively displaceable panels in a fifth position and a bale further exiting the ejection chute.
FIG. 8 shows a section thorough the ejection chute of FIG. 2 with the selectively displaceable panels in a sixth position and a bale further exiting the ejection chute.
Figure 9:
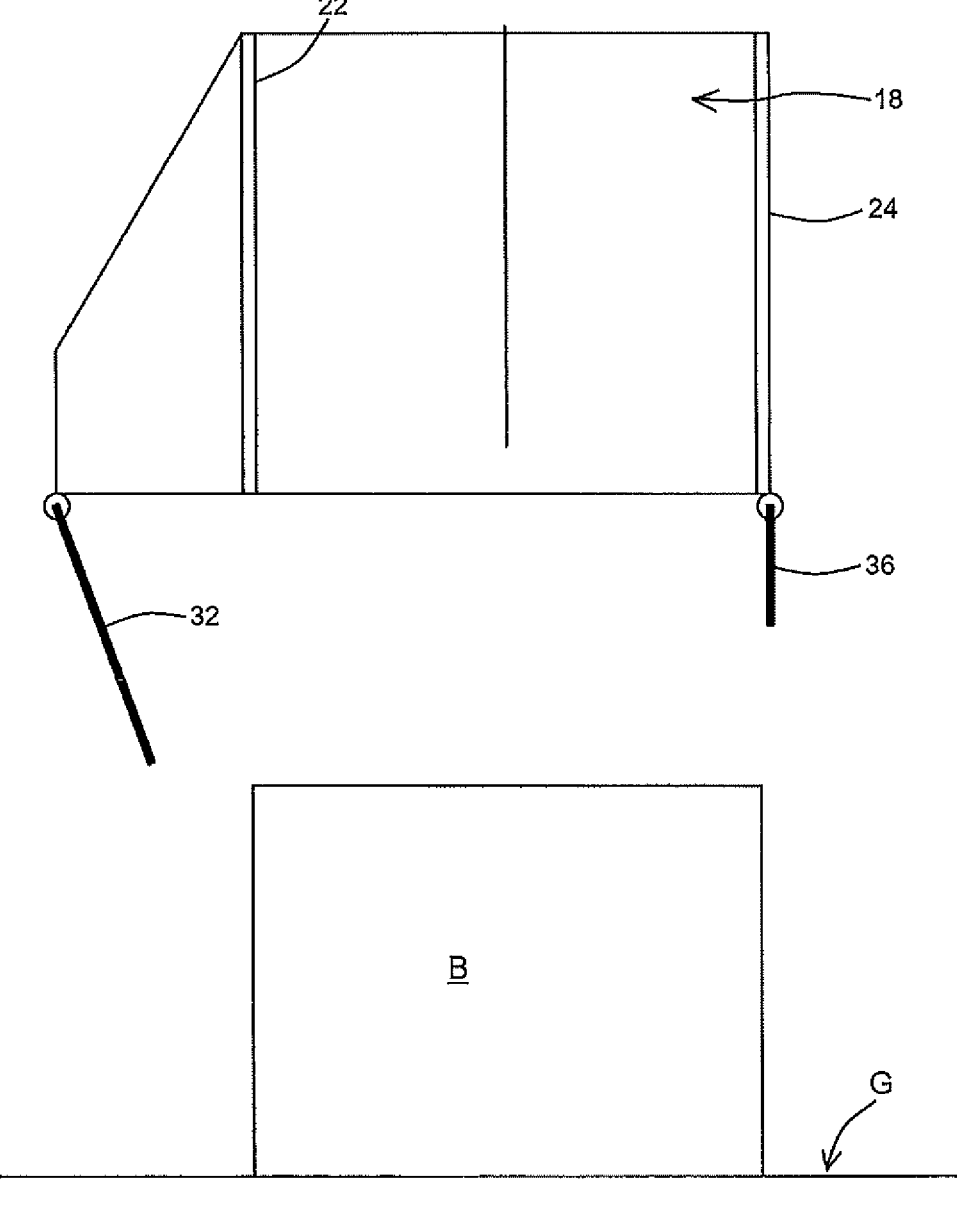
FIG. 9 shows a section thorough the ejection chute of FIG. 2 with the selectively displaceable panels in a final position and a bale on the ground.

Continued movement of the first selectively displaceable panel 32 about the longitudinal axis 34 under the action of the actuator 40 then removes the first selectively displaceable panel 32 from the path of the formed bale B (FIG. 6)

allowing the formed bale B to drop out of the ejection chute 18 (FIG. 7) toward the ground (FIG. 8) before the formed bale B lands on the ground beneath the ejection chute 18 of the baler 2 (FIG. 9).

In this way the bale the formed bale B is falling freely for a shorter distance than when ejected from the rear of the ejection chute. As a result, the formed bale B is deposited to the ground in a far more controlled manner.

Figures 10, 11:
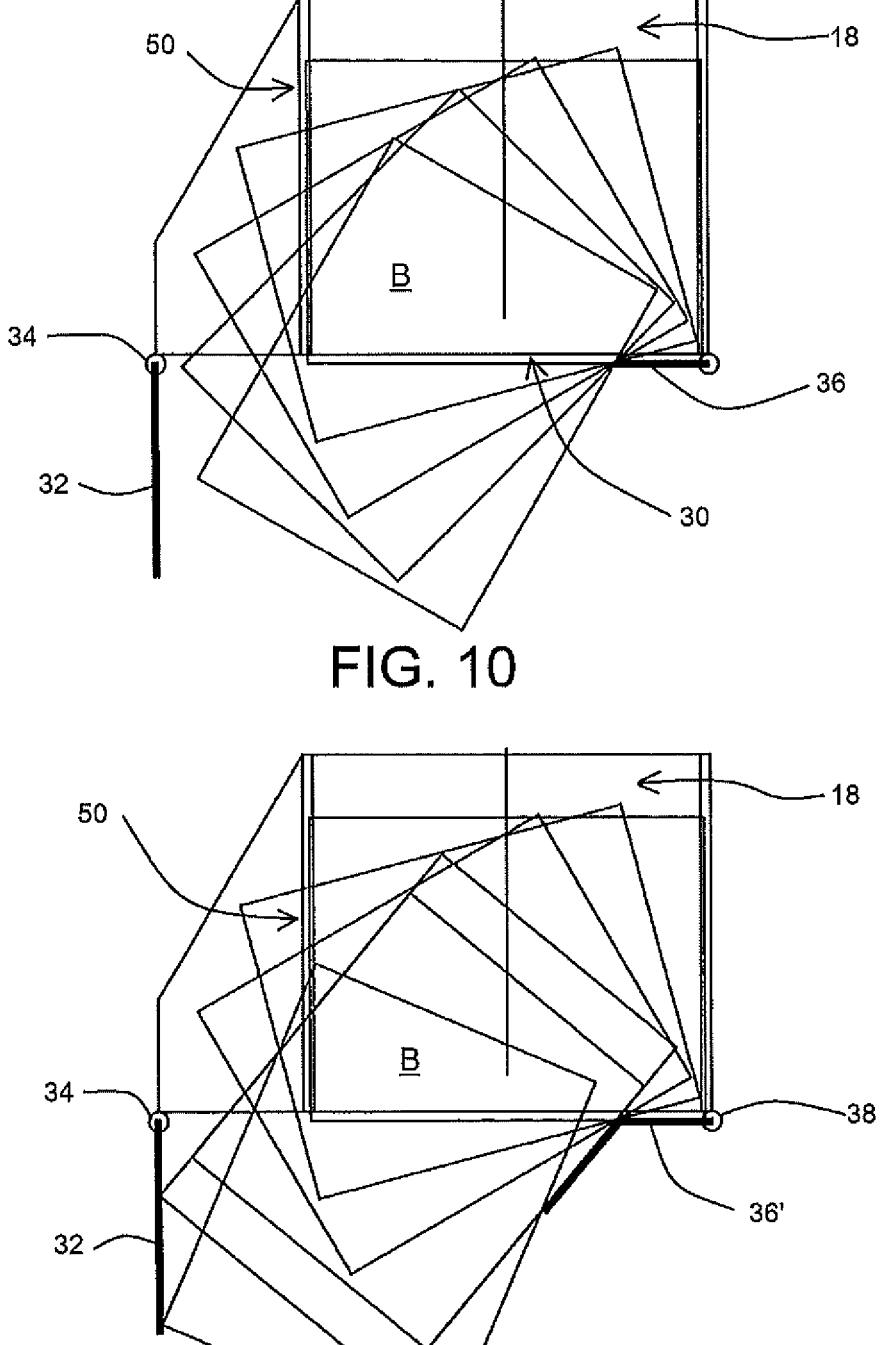
FIG. 10 shows a section thorough a second embodiment of an ejection chute in accordance with the present invention with the selectively displaceable panels in a final position and a bale further exiting the ejection chute and showing the travel of the bale as it exits the ejection chute.
FIG. 11 shows a section thorough a third embodiment of an ejection chute in accordance with the present invention with the selectively displaceable panels in a final position

A second embodiment is shown in FIG. 10. The ejection chute 18 is of substantially the same construction as that of the previous embodiment (and like reference numerals will be used for like parts) save that a second window 50 is provided in the second side wall 24. The second window 50 is again sized and shaped to allow passage of a formed bale B. A lower edge of the second window 50 is contiguous with the first window 30 to form a single large opening.

In this embodiment the actuators 40, 42 are operated only to permit movement of the first selectively displaceable panel 32 about the longitudinal axis 34, with the second selectively displaceable panel 36 being held in position extending horizontally beneath the window 30. In this embodiment the formed bale B will topple over the second selectively displaceable panel 36 and as it passes through the first and second windows 30,50 perform a quarter turn. The substantially vertically depending first selectively displaceable panel 32 will act as a guide such that the formed bale B is directed to be deposited on the ground G on a shorter side (FIG. 10).

Other arrangements or constructions of the second selectively displaceable panel may be considered. For example, the second selectively displaceable panel 36' may be formed as an angled plate comprising a first portion extending from the longitudinal axis 38 and a second portion extending downward at an angle to the first portion (FIG. 11). It will be understood that in this third embodiment greater control of the quarter turn of the formed bale B is provided for as the second portion of the second selectively displaceable panel 36' and the substantially vertically depending first selectively displaceable panel 32 together provide greater guidance for the movement of the formed bale as it is deposited from the ejection chute 18 to the ground.

A fourth embodiment is shown in FIG. 12. While the first selectively displaceable panel 32 takes the form of the first two embodiments, the ejection chute 18 is further provided with a deflector element 60. In the illustrated embodiment, the deflector element 60 is substantially L-shaped. A first limb of the deflector 60 extends substantially vertically from the second selectively displaceable panel 36 and the second limb extends substantially horizontally inward beneath the ejection chute 18. The second limb extends further than the second selectively displaceable panel 36. In practice movement of the lower end of the toppling formed bale B is further guided or constrained between a distal end of the second limb and the substantially vertically depending first selectively displaceable panel 32.

It will be appreciated that in these embodiments both the first and second selectively displaceable panels 32, 36 may be operated as in the first embodiment so to allow the formed bale B to drop and be deposited on a longer side. The operator may select which of the drop methods is to be utilised by way of a Human Machine Interface 48 in electronic communication with the controller 44. The Human Machine Interface 48 may be provided on the baler 2 such that a selection may be made prior to baling or incorporated into the towing vehicle, for example by being located within the driver's cab, allowing the operator to select the chosen deposit method while baling.

The electronic controller 44 may communicate with the other elements by way of a suitable communications network 49.

Alternatively, in those embodiments incorporating the second window 50, the second selectively displaceable panel 36 may be replaced by a fixed panel. In such an arrangement the deposit mechanism will only be able to function in a quarter turn deposit mode.

A fifth embodiment is shown in FIG. 13. In this embodiment a second ejection chute 118 is shown alongside the first. The second ejection chute 118 is provided with a first selectively displaceable panel 132 and a second selectively displaceable panel 136 to selectively obstruct a window 130 in a base wall of the second ejection chute 118. Additional actuators 140,142 are provided in electronic communication with the controller 44. An additional sensor 146 in communication with the controller 44 may optionally be provided to determine when the formed bale B' is in position above the window 130.

It will be understood that the second ejector chute 118 is of similar construction to the first and second embodiments save that the constructions are reversed such that the second selectively displaceable panel 36 of the first ejection chute 18 is located adjacent the second selectively displaceable panel 136 of the second ejection chute 118. It will be understood that the controller 44 operates so that formed bales B, 1 may be ejected vertically or adopt a quarter turn as desired.

A sixth embodiment is shown in FIG. 15. In this embodiment a second ejection chute 118 is shown alongside the first ejection chute 18. The second ejection chute 118 is provided with a first selectively displaceable panel 132 and a second selectively displaceable panel 136 to selectively obstruct a window 130 in a base wall of the second ejection chute 118. Additional actuators 140,142 are provided in communication with the controller 44. An additional sensor 146 in communication with the controller 44 may optionally be provided to determine when the formed bale B' is in position above the window 130.

It will be understood that the second ejector chute 118 is of similar construction to that of the fourth embodiment save that the constructions are reversed such that the second selectively displaceable panel 36 of the first ejection chute 18 is located adjacent the second selectively displaceable panel 136 of the second ejection chute 118. It will be understood that the controller can be operated so that formed bales B,B1 may be ejected by the quarter turn deposit method only.

It will be understood that should the actuators 40,42,140, 144 fail to operate for any reason the formed bales B,B' will remain supported within the ejection chute 18 or chutes 18,118 such that continued operation of the reciprocating plunger to form further bales will simply lead to the ejection of the formed bale B or bales B,B' from the rear of the ejection chute 18 or chutes 18,118 as is currently known.

In further embodiments, the actuators may be omitted and operation of the first and second displaceable panels is triggered by operation of a mechanical apparatus and not by an electronic controller. By way of example with reference to FIG. 2, progress of the formed bale B within the ejection chute 18 can be monitored by a star wheel in a known manner. Alternatively, a flap pivotable about an axis may be provided in the ejection chute such that once the formed bale has advanced to a position to be dropped through the opening 30, the flap has pivoted to trip a mechanical switch to allow release of the first and second displaceable panels, for example by releasing mechanical latches either by way of a mechanical linkage or by way of a release cable. The relative speed of rotation of the first and second displaceable panels about their axes can be moderated by providing spring elements of appropriate relative strength. In this way, mechanical mechanisms can replace the actuators of previous embodiments. Once the formed bale has passed the respective displaceable panels, the spring elements return the displaceable panels to their first positions re-engaging the mechanical latches.

In the embodiments of FIGS. 10, 11 and 12 a single mechanical apparatus may be provided for controlling operation of both displaceable panels, for example to ensure linear dropping of the formed bale. Alternatively, a first mechanical apparatus may be provided to control operation of the first displaceable panel and second mechanical apparatus may be provided to control operation of the second displaceable panel. In either case a mechanical interlock operable by an operator may be provided to determine whether the ejector chute is set to deposit a bale by way of a linear drop (both displaceable panels being allowed to be released) or by way of a quarter turn drop (in which only the first displaceable panel 32 is allowed to be released) during operation of the baler. Such a mechanical interlock can be provided either for a baler having a single ejector chute or one having first and second ejector chutes.

From reading the present disclosure, other modifications will be apparent to persons skilled in the art. Such modifications may involve other features which are already known in the field of square balers and component parts therefore and which may be used instead of or in addition to features already described herein.

The invention claimed is:

1. An ejection chute for an agricultural baler comprises a channel having a base wall and first and second side walls extending upwards from either side of the base wall, in which a region of the base wall is provided with a first window shaped and sized to allow a formed bale to pass though the window, the base wall including an outwardly extending flange extending to one side of the ejection chute outward of the first sidewall, and a deposit mechanism for controlling movement of a formed bale through the first window, the deposit mechanism comprising a first selectively displaceable panel adapted to pivot about a longitudinal axis located to a first side of the first window at a distal end of the flange and a second selectively displaceable panel adapted to pivot about a longitudinal axis located at a second side of the first window such that the longitudinal axis of the second selectively displaceable panel extends along a base of the second wall.

2. The ejection chute according to claim 1, in which the first panel is selectively displaceable between a first position in which travel of a formed bale through the first window is prevented and a second position in which deposit of the formed bale through the first window is permitted.

3. The ejection chute according to claim 1, in which the first side wall of the ejection chute is provided with a laterally extending support for the first selectively displaceable panel.

4. The ejection chute according to claim 1 in which the first side wall of the ejection chute is provided with a second window extending alongside the first window in the base panel.

5. The ejection chute according to claim 1, in which the second selectively displaceable panel is selectively displaceable between a first position in which travel of a formed bale through the first window is prevented and a second position in which deposit of the formed bale through the first window is permitted.

6. The ejection chute according to claim 5, in which the second selectively displaceable panel includes a second portion formed at an angle to a first portion.

7. The ejection chute according to claim 5, in which a first mechanical apparatus controls operation of the first and second selectively displaceable panels.

8. The ejection chute according to claim 5, in which a first mechanical apparatus controls operation of the first selectively displaceable panel and a second mechanical apparatus controls operation of the second selectively displaceable panel.

9. The ejection chute according to claim 1, in which the ejection chute further comprises a deflector suspended from the first selectively displaceable panel.

10. The ejection chute according to claim 1, further comprising a first actuator associated with the first selectively displaceable panel, whereby the first actuator controls the displacement of the first selectively displaceable panel.

11. The ejection chute according to claim 10, in which the first actuator is in communication with a controller configured to control actuation of the first actuator.

12. The ejection chute according to claim 10, in which the ejection chute also comprises a second actuator associated with the second selectively displaceable panel, whereby the second actuator controls the displacement of the second selectively displaceable panel.

13. The ejection chute according to claim 12, in which the second actuator is in communication with a controller configured also to control actuation of the first actuator.

14. The ejection chute according to claim 1, in which a mechanical apparatus is provided to control displacement of the first selectively displaceable panel.

15. An agricultural baler comprising a baling mechanism including a baling chamber for the sequential production of square bales, and an ejection chute in accordance with claim 1.

16. An agricultural baler comprising:

a baling mechanism including a first baling chamber and a second baling chamber for the sequential production of square bales, the second baling chamber producing square bales concurrently with the first baling chamber;

a first ejection chute and a second ejection chute with each of the first and second ejection chutes comprising a channel having a base wall and first and second side walls extending upwards from either side of the base wall, in which a region of the base wall is provided with a first window, and a deposit mechanism for controlling movement of a formed bale through the first window.

17. An agricultural baler according to claim 16 in which each deposit mechanism comprises at least a first selectively displaceable panel at a first side of the first window, the first panel being selectively displaceable between a first position in which travel of a formed bale through the first window is prevented and a second position in which deposit of the formed bale through the first window is permitted, wherein each of the first and second ejection chutes comprise a first actuator associated with the first selectively displaceable panel, whereby the first actuator controls the displacement of the first selectively displaceable panel, and wherein the actuator of the second ejection chute is in communication with the controller configured also to control actuation of the actuator of the first ejection chute.

18. The agricultural baler according to claim 17, in which the first selectively displaceable panel of the first ejection chute is located adjacent to the first selectively displaceable panel of the second ejection chute.

* * * * *